United States Patent [19]

Walker et al.

[11] Patent Number: 5,248,957
[45] Date of Patent: Sep. 28, 1993

[54] METHOD OF DETECTING A DEFLATED TIRE ON A VEHICLE

[75] Inventors: John C. Walker, Sutton; Lavinder S. Rehal, Walsgrave-on-Sowe, both of Great Britain

[73] Assignee: Sumitomo Rubber Industries Limited, Hyogo, Japan

[21] Appl. No.: 802,214

[22] Filed: Dec. 4, 1991

[30] Foreign Application Priority Data

Dec. 6, 1990 [GB] United Kingdom ............. 9026560

[51] Int. Cl.$^5$ .............................. B60C 23/00
[52] U.S. Cl. ................... 340/444; 73/146.2; 364/565
[58] Field of Search ............ 73/146, 146.2, 146.3, 73/146.4, 146.5; 364/565, 558; 340/442, 444, 671; 116/34 R

[56] References Cited
U.S. PATENT DOCUMENTS 4,876,528 10/1989 Walker et al. .................. 340/444

Primary Examiner—Donald O. Woodiel

[57] ABSTRACT

A method of detecting a deflated tire on a vehicle by comparing the rolling radii of the tires by comparing angular velocity speed signals from wheel speed sensors. One wheel speed sensor being provided at each wheel. Before the comparison of the signals is carried out, corrected wheel speed signals for each of the second, third and fourth wheels are calculated giving corrections for a set of factors comprising vehicle speed, lateral acceleration and longitudinal (fore/aft) acceleration. The corrections each comprise a constant for the factor concerned times the respective factor. The set of constants for each wheel is derived by taking the vehicle through a range of speeds, lateral and fore/aft accelerations and using multiple regression techniques and the respective factors are calculated from the set of uncorrected wheel speed signals so that comparison of the wheel speeds can be made without false signals from tire deflections caused by speed, lateral or fore/aft acceleration induced tire deflections.

11 Claims, 1 Drawing Sheet

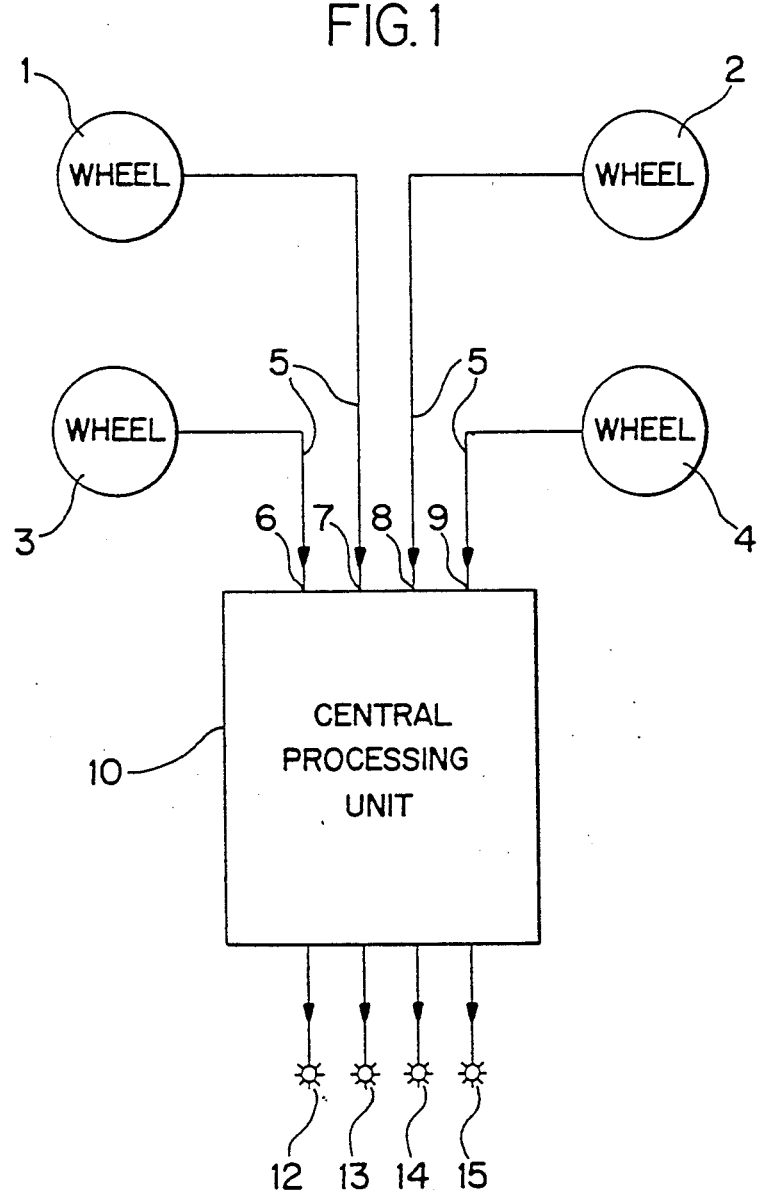

METHOD OF DETECTING A DEFLATED TIRE ON A VEHICLE

This invention relates to a method of detecting a deflated tire on a vehicle suitable for cars, trucks or the like, and particularly to the system disclosed in for example French Patent Publication 2568519 and European Patent Publication No. 291217.

These Patents propose using wheel speed signals from the vehicle wheels, such as for example the signals from anti-lock braking systems which are multi-pulse signals or single-pulse signals for each rotation of each wheel. They compare the speed derived signals of the wheels in various ways to try to avoid false signals due to factors such as vehicle cornering, braking, accelerating, uneven and changing load etc.

French Patent Publication 2568519 monitored the sums of the speeds of the diagonally opposed pairs of wheels for a long time or distance period so that it averaged out some of these errors. The result however was that the device operated very slowly taking many kilometers to sense pressure loss.

European Patent Publication No 291 217 substantially improved this situation by calculating the lateral and longitudinal accelerations of the vehicle using the same four-wheel speed signals and setting fixed limits above which the detection system was inhibited to avoid false signals due to cornering and acceleration. This system also suggested a correction for high vehicle speeds and for the first time introduced the ability to calibrate the system to suit the particular vehicle, and indeed the actual tires fitted which themselves could have different properties from one another in respect of rolling radius. The calibration was carried out in straight line running, however, so whilst some vehicle conditions were allowed for the problems of detection during high speed running, cornering and braking under modern road conditions and particularly in higher performance vehicles could not be allowed for. The resultant system still needed to be inhibited for detection in a fair percentage of the vehicle running time. All attempts to improve this position resulted in loss of sensitivity of the system and/or loss of ability to sense which wheel or wheels was deflated if false signals were not to occur and made application of the system less effective.

SUMMARY OF THE INVENTION

An object of the present invention is to provide, in a system of the above type, the ability to sense deflations during higher levels of vehicle acceleration both laterally and longitudinally without false signals.

According to one aspect of the present invention, a method of detecting a deflated tire on a vehicle by comparing the rolling radii of the tires by means of comparing angular velocity speed signals from wheel speed sensors one at each wheel characterised by, before the comparison of the signals is carried out, calculating corrected wheel speed signals for each of the second, third and fourth wheels giving corrections for a set of factors comprising vehicle speed, lateral acceleration and longitudinal (fore/aft) acceleration, the corrections each comprising a constant for the factor concerned x the respective factor, the set of constants for each wheel being derived by taking the vehicle through a range of speeds, lateral and fore/aft accelerations and using multiple regression techniques and the respective factors being calculated from the set of uncorrected wheel speed signals so that comparison of the wheel speeds can be made without false signals from tire deflections caused by speed, lateral or fore/aft acceleration induced tire deflections.

Preferably in addition, the corrections comprise a further constant × the square of the lateral acceleration; and/or a further constant × fore/aft acceleration × lateral acceleration; and/or a further constant × speed × lateral acceleration; and/or a further constant × speed × fore/aft acceleration; and/or a further constant × speed × lateral acceleration × fore and aft acceleration; and/or a further constant × speed squared and/or a further fixed constant.

Having carried out the corrections to the speed signals, various comparisons between the speeds of the respective wheels can then be made depending upon the particular choice of ratios made.

The speed signals themselves may be multi-purpose signals such as are typical from ABS-type wheel speed generators or may comprise single-pulses from a wheel speed signal generator which gives a pulse for each revolution of the wheel. The speed signals may therefore be digital pulse signals or time periods timing the time for one rotation of each wheel and in that case a correction may be made to give the four wheel speeds at the same instant in time such as is described in our copending UK Patent Application No. 9002925.7 dated Feb. 9, 1990.

The comparison of the wheel speed signals preferably comprises subtracting the sum of the signals from one pair of diagonally opposite wheels from the sum of the signals of the other pair of diagonally opposite wheels, sensing when the magnitude of the result is between 0.05% and 0.6% of the mean of the sums and when that magnitude is in said range, operating a warning device to indicate a tire is partially or completely deflated.

In addition, the comparison may comprise comparing the non-corrected signals from each of the four wheels in turn with the non-corrected signals for each of the other wheels, sensing when one of said signals is different from the average of all four signals by more than 0.1% and in the event of both this signal and the diagonals comparison being in the specified ranges then indicating that the tire is partially or completely deflated. These signals may be corrected by a simple set of controls to allow for variations between the tire by means of calibration carried out at a constant speed in a straight line. These later comparisons provide means of detecting which particular wheel of the set is deflated and therefore the provision of an indication to the driver as to which wheel is concerned.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

Further aspects of the present invention will become apparent from the following description by way of example only in conjunction with the attached diagrammatic drawings, in which:

FIG. 1 is a schematic diagrammatic drawing showing a deflation warning device for a car with four wheels.

DETAILED DESCRIPTION OF THE PREFERRED EMBODIMENTS

The apparatus shown in FIG. 1 provides a deflation warning device for four wheels, 1, 2, 3, and 4, the wheels 1 and 2 being the front wheels and the wheels 3 and 4 the rear wheels of a car. Each wheel 1, 2, 3 and 4 has a wheel speed generating device associated with it. This may be of the toothed wheel type as used to provide a digital signal for electronic ABS equipment or merely the single-pulse type which generates a pulse one per wheel revolution. In this case the generator may be a single magnet attached to each wheel for rotation therewith and a stationary pickup mounted on the suspension.

The signals from each wheel are carried through cables 5 to provide input 6, 7, 8 and 9 to a central processing unit 10.

Four outputs from the central processing unit are connected to four warning indicators 12, 13, 14 and 15, one for each of the wheels respectively.

The central processing unit 10 is basically a computer and in the case where the vehicle already has an ABS-system fitted may be the same computer as the ABS-system. Alternatively a separate central processing unit may be provided. The central processing unit 10 monitors the various signals and compares them to determine whether or not an outward signal should be given to indicate that any tire on the vehicle is deflated.

The central processing unit 10 can calculate substantially what the vehicle is doing using the four wheel speed signals. Firstly it can calculate the vehicle speed at any instant using either a single wheel as a reference or all four and calculating the mean. Secondly it can calculate the apparent longitudinal acceleration of the vehicle by comparing the angular velocity signals from the front and rear pairs of wheels with the forward speed calculated from the mean of the angular velocities of all four wheels. It can also calculate the apparent lateral acceleration of the vehicle comparing the angular velocity signals for the wheels on each side of the vehicle and then comparing them with the forward speed calculated from the mean of the angular velocities of all four wheels. Thus the central processing unit 10 can calculate substantially accurately what the vehicle is physically doing which allows it to then use a particular formula which will be described below to correct the wheel speed signals for three of the wheels allowing for what the vehicle is doing.

Having obtained the four corrected wheel speed signals C1, C2, C3 and C4 the system can then calculate an error signal dT by comparing the angular velocities of the wheels according to the formula $$dT = 2 \times \frac{(C1\text{-}4 - C2\text{-}3)}{(C2\text{-}3 + C1\text{-}4)} \times 100$$

where $C1\text{-}4 = C1 + C4$ and $C2\text{-}3 = C2 + C3$.

This error or dT signal is monitored and the processing unit senses and indicates a deflation if the signal is greater than 0.05% and less than 0.6%.

The next step is to find which tire is punctured.

The unit carries out this determination by looking at the difference between each wheel's non-corrected angular velocity in turn and the average speed of the four wheels using non-corrected speeds C1, C2, C3 and C4. If the difference between any one wheel and the average is more than 0.1% a second signal is generated to indicate which wheel is partially or substantially deflated.

This check may be performed using speed signals corrected to allow for tire differences in the set of tires by means of simply correcting. This is done by running the vehicle in a straight line at a constant speed and deriving correction factors.

As mentioned above this system detects whether or not a puncture exists using the corrected wheel speed C2, C3 and C4 corrected on the basis of C1 being itself correct. The correction in speeds is achieved by using a formula which comprises:

$C = A1 \times \text{speed}^2 + A2 \times \text{speed} + A3 \times (\text{lateral acceleration})^2 + A4 \times (\text{lateral acceleration}) + A5 \times (\text{fore-/aft acceleration}) + A6 \times \text{speed} \times \text{lateral acceleration} + A7 \times \text{speed} \times \text{fore and aft acceleration} + A8 \times \text{lateral acceleration} \times \text{fore and aft acceleration} + A9 \times \text{speed} \times \text{lateral acceleration} \times \text{longitudinal fore and aft acceleration} + A10$ where A1 to A10 are constants for the particular wheel concerned.

The constants A1 to A10 are determined by a prior calibration for the vehicle and provide corrections for the wheel speed concerned to allow for changes in rolling radius caused by changes in weight on the particular wheel concerned by the effects of acceleration, braking, etc on the vehicle. The constants also correct for the particular vehicle concerned for differences due to tire growth due to wheel speed.

The constants are found by a practical method by means of using a calibration routine which comprises driving the vehicle through a full range of accelerations both longitudinally and laterally in both directions of left and right turns and covering all other possible vehicle use conditions.

This can readily be achieved by driving the vehicle on a mixed road test and the central processing unit constantly monitors the effects on wheel speeds and records them. The entire top range results are then ignored to avoid later errors, i.e. the top 5 or 10% of acceleration figures.

The central processing unit is then set into a multiple regression analysis procedure using any of the standard techniques to calculate the ten constants A1 to A10 which gives it the necessary correction system to make sure that wheel speeds are made independent of extraneous factors such as weight transfer in the vehicle and cornering and acceleration.

It should be noted that it is not necessary to calibrate each vehicle in a particular type by this method and the central processing unit may be reprogrammed for that model of vehicle because it allows for the basic vehicle characteristics which are set by its body shape, center of gravity position and suspension characteristics. In some circumstances similar calibration can be used for more than one type of vehicle without recalibrating but the basic principal of the invention is that it provides the ability to correct wheel speeds for all vehicle characteristics in use.

This correction system may be used with other wheel speed comparisons to provide deflation warning and can if necessary be used for correction of wheel speeds for calculation of other vehicle factors, such as for example torque control.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Having described our invention what we claim is:

1. A method of detecting a deflated tire on a vehicle comprising the steps of:

rotating tires of the vehicle;

providing one wheel sensor for each of the tires;

detecting angular velocity speed of the tires by the wheel sensors;

calculating corrected wheel speed signals for each of the second, third and fourth wheels giving corrections for a set of factors comprising vehicle speed, lateral acceleration and longitudinal (fore/aft) acceleration, the corrections each comprising a constant for the factor concerned times the respective factor, the set of constants for each wheel being derived by taking the vehicle through a range of speeds, lateral and fore/aft accelerations and using multiple regression techniques and the respective factors being calculated from the set of uncorrected wheel speed signals so that comparison of the wheel speeds can be made without false signals from tire deflections caused by speed, lateral or fore/aft acceleration induced tire deflections;

comparing the angular velocity speed signals from the wheel speed sensors;

comparing the rolling radii of the tires by the comparing of the angular velocity speed signals; and issuing a warning signal when at least one of the tires is determined to be at least partially deflated from differences in the rolling radii of the tires.

2. The method according to claim 1, wherein the corrections comprise a further constant times the square of the lateral acceleration.

3. The method according to claim 1, wherein the corrections comprise a further constant times fore/aft acceleration times lateral acceleration.

4. The method according to claim 1, wherein the corrections comprise a further constant times speed times lateral acceleration.

5. The method according to claim 1, wherein the corrections comprise a further constant times speed times fore/aft acceleration.

6. The method according to claim 1, wherein the corrections comprise a further constant times speed times lateral acceleration times fore and aft acceleration.

7. The method according to claim 1, wherein the corrections comprise a further constant times speed squared.

8. The method according to claim 1, wherein the corrections comprise a further fixed constant.

9. The method according to claim 1, wherein the vehicle has four wheels, the method comprising a comparison of the corrected wheel speed signals comprising subtracting the sums of the signals from one pair of diagonally opposite wheels from the sum of the signals from the other pair of diagonally opposite wheels, sensing when the magnitude of the result is between 0.05% and 0.6% of the mean of the sums and when the magnitude is in said range, operating a warning device to issue the warning signal to indicate a tire is at least partially deflated.

10. The method according to claim 9, comprising additionally comparing the non-corrected signals from each of the four wheels in turn with the average speed of the four wheels, sensing when one of said signals is different from the average of all four signals by more than 0.1% and in the event of both said signals being present indicating that the tire is at least partially deflated.

11. The method according to claim 9, wherein the signals are corrected relative to one another based on constants derived from straight line running of the vehicle at a single speed.

* * * * *